Oct. 18, 1960  F. K. KNOHL  2,956,470
PIERCING AND TAPPING SCREW
Original Filed April 19, 1956

INVENTOR.
Friedrich Karl Knohl
BY
Olson & Trexler
attys.

United States Patent Office 2,956,470
Patented Oct. 18, 1960

2,956,470
PIERCING AND TAPPING SCREW

Friedrich Karl Knohl, Chicago, Ill., assignor to Illinois Tool Works, Chicago, Ill., a corporation of Illinois Original application Apr. 19, 1956, Ser. No. 579,298, now Patent No. 2,833,326, dated May 6, 1958. Divided and this application Mar. 25, 1958, Ser. No. 723,910

2 Claims. (Cl. 85—47)

The present invention relates to a novel rotary fastener, and more particularly to a novel thread cutting screw. This application is a division of my co-pending application Serial No. 579,298, filed April 19, 1956, now U.S. Patent No. 2,833,326.

In the manufacture of various appliances such as stoves, washing machines and the like as well as various other structures, many parts or sheet metal members are connected to each other or to frame elements by screws extending through apertures in the members and having threads engaging at least one of the members. Frequently thread cutting or forming screws have been provided so as to form complementary threads in a workpiece during application of the screw. Application of such screws to the workpieces or members is sometimes made relatively difficult by a slight misalignment of the apertures in the workpieces. Furthermore, panels of various electrical appliances such as those mentioned above are frequently coated with enamel or ceramic material which may clog apertures in the panels so as to make initial application of the screws relatively difficult.

An important object of the present invention is to provide a novel thread cutting screw which may be more easily applied to a plurality of apertured panels or workpieces.

A more specific object of the present invention is to provide a novel screw having an entering end portion formed so as to facilitate initial application of the screw to a plurality of apertured workpieces even though the apertures in the workpieces or panels may be undersized or slightly out of alignment or clogged with ceramic or other material.

Other objects and advantages of the present invention will become apparent from the following description and the accompanying drawings wherein.

Figure 1:
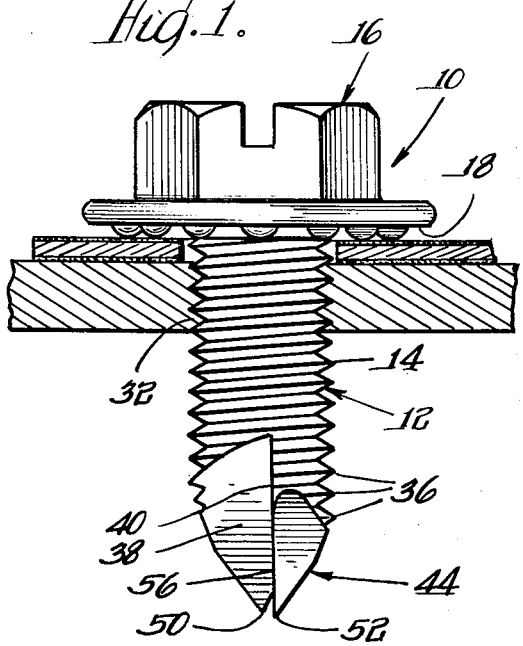
Fig. 1 is a partial sectional view showing a screw member incorporating features of the present invention applied to a pair of apertured panels.
Figure 2:
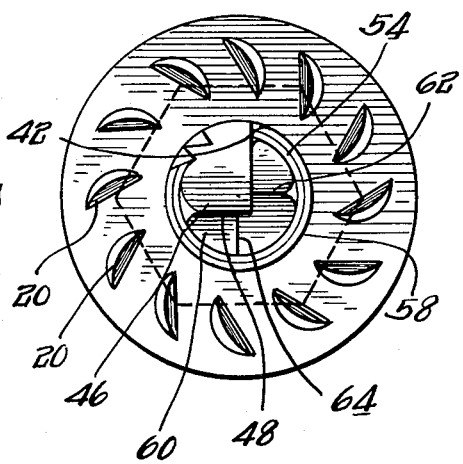
Fig. 2 is an entering end view of the screw member.

Referring now more specifically to the drawings, wherein like parts are designated by the same numerals throughout the various figures, a screw member 10 incorporating features of the present invention is provided with an elongated axially extending shank portion 12 having helical thread convolutions 14 thereon. A head portion 16 is integrally joined with a trailing end of the shank portion and certain features of the head portion are claimed in my above mentioned co-pending application. However, these features are not included in the invention claimed herein and therefore, it suffices to state that the head portion is provided with suitable tool engageable surface means or with a suitable configuration for facilitating turning of the screw member. The head portion is provided with a generally radially extending clamping face for overlying a workpiece, from which face numerous protuberance means 20 project for the purpose described fully in my above mentioned co-pending application.

Figure 3:
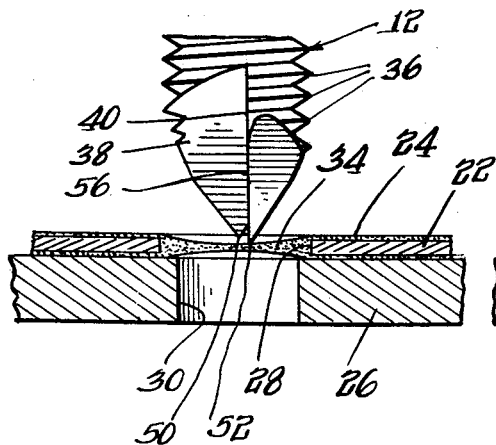
Fig. 3 is a fragmentary partial sectional view showing an entering end of a screw member incorporating features of the present invention in position for initial insertion through a workpiece having an aperture clogged with ceramic or other material.

While the screw member 10 may be used for various purposes, it is particularly suitable for securing a plate or panel 22 having a coating 24 of enamel or ceramic material or the like to another panel or frame member 26. The panel or workpiece 22 is provided with an aperture 28 preferably having a diameter slightly larger than the outside diameter of the screw shank portion 12. The panel or workpiece 26 is provided with an aperture 30 generally aligned with the aperture 28 and initially having a diameter less than the outside diameter of the screw shank portion. Preferably, the aperture 30 is initially defined by a smooth wall so that thread convolutions 32 complementary to the convolutions 14 are formed in the aperture wall during application of the screw member to the workpieces. As shown in Fig. 3, the aperture 28 may initially be clogged by a web 34 of the enamel or ceramic material, which web must be broken in order to permit insertion of the screw member shank portion through the workpiece apertures.

Figure 4:
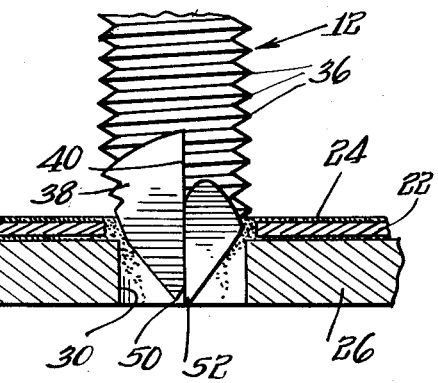
Fig. 4 is a view similar to Fig. 3 but shows the entering end of the screw partially inserted into the workpieces.

A portion 36 of the screw shank thread convolutions adjacent an entering end of the screw shank are tapered or of diminishing heights and are interrupted by an axially extending recess 38 so that a thread cutting edge 40 is provided at the junction between one wall 42 of the recess and the thread convolutions 36. Thus, the screw member is adapted to form complementary threads in the workpiece 26 during application of the screw member to the workpiece. An entering end portion 44 of the screw shank is pointed in the manner shown so as to facilitate starting of the screw into the aperture in the workpiece 26 in the event this aperture may be slightly undersized or slightly out of alignment with the aperture in the outer workpiece 22. This generally pointed structure also facilitates initial breaking of web 34 or other means clogging the aperture in the outer workpiece. It is important to note that the wall 42 and thus the cutting edge 40 are offset from the axis of the screw shank. In addition, another wall 46 of the recess which is disposed at right angles to the wall 42 is formed so that it traverses the axis of the screw shank and provides an edge 48 at a junction with the peripheral surface of the entering end portion 44, which edge 48 is laterally offset from the axis of the screw shank. It will be noted that the arrangement is such that the axis of the screw shank is located generally in the corner of an angle provided by planes parallel to the axis and containing the edges 40 and 48. As a result of this construction, the entering end portion of the screw shank is provided with a pair of relatively sharply pointed tips 50 and 52 which help to break through any ceramic material or the like clogging a workpiece aperture. Preferably, a surface 54 of the entering end portion 44 behind an extension 56 of the cutting edge 40 which traverses the entering end portion is flattened and relieved so as to provide clearance behind the cutting edge to promote a more effective cutting action. It will be noted that the extension 56 of the cutting edge serves to ream out any material clogging the aperture in the workpiece 22 as indicated in Fig. 4 so as to facilitate application of the screw member to the workpiece. This cutting edge extension may also serve to ream out the aperture in the workpiece 26 in the event this aperture is clogged, undersized or misaligned so as further to facilitate assembly of the screw member with the workpieces. Furthermore, the entering end portion 44 of the screw shank is preferably provided with additional substantially flat sides 58 and 60 and straight edges 62 and 64 between the sides which aid in the reaming operation.

While the preferred embodiment of the present invention has been shown and described herein, it is obvious that many structural details may be changed without departing from the spirit and scope of the appended claims.

The invention is claimed as follows:

1. A screw member comprising an axially extending shank, said shank including a plurality of helical thread convolutions, a substantially pointed entering end portion, and a single recess formed in and traversing said entering end portion, said thread convolutions adjacent said entering end portion diminishing in diameter to said entering end portion, said recess being defined on one side by a first surface laterally offset from a plane including the longitudinal axis of said shank and intersecting said thread convolutions of diminishing diameter and a peripheral surface of said pointed end portion for providing cutting edge means lying in said plane for reaming an aperture in a workpiece to which the shank is applied and for forming complementary thread convolutions in the workpiece, said recess being defined on the other side by a second surface intersecting said entering end portion peripheral surface and disposed at an angle of about 90° with respect to said plane and cutting edge means with said axis being located within a corner provided by said angle at least at the extremity of said entering end portion whereby said entering end portion includes first and second laterally spaced points respectively intersected by said edge means and said second edge for facilitating initial application of the screw member to an aperture in a workpiece.

2. A screw member, as defined in claim 1, wherein said entering end portion includes first and second generally flattened sides respectively intersecting said first and second surfaces, and a third generally flattened side between said first and second sides and intersecting both of said first and second surfaces, junctions between said first and third sides and said second and third sides providing edges for promoting the reaming action of the entering end portion during initial application of the screw member to an apertured workpiece.

References Cited in the file of this patent

UNITED STATES PATENTS

| | | |
|---|---|---|
| 48,133 | Bonwill | Nov. 22, 1864 |
| 88,539 | Bocking | Apr. 6, 1869 |
| 373,074 | Jones | Nov. 15, 1887 |
| 1,066,253 | Cornelius | July 1, 1913 |
| 2,403,359 | Gerhold | July 2, 1946 |
| 2,572,647 | Merwin | Oct. 23, 1951 |
| 2,740,315 | Gouverneur | Apr. 3, 1956 |